United States Patent
Scaramucci et al.

(10) Patent No.: US 10,384,317 B2
(45) Date of Patent: Aug. 20, 2019

(54) KIT FOR MOUNTING A VALVE POSITION INDICATOR TO A VALVE

(71) Applicant: Valve Innovations, LLC, Oklahoma City, OK (US)

(72) Inventors: John P. Scaramucci, Oklahoma City, OK (US); David C. Sparks, Oklahoma City, OK (US)

(73) Assignee: Valve Innovations, LLC, Oklahoma City, OK (US)

( * ) Notice: Subject to any disclaimer, the term of this patent is extended or adjusted under 35 U.S.C. 154(b) by 260 days.

(21) Appl. No.: 15/175,898

(22) Filed: Jun. 7, 2016

(65) Prior Publication Data

US 2017/0348810 A1 Dec. 7, 2017

(51) Int. Cl.
*B23P 15/00* (2006.01)
*F16K 27/06* (2006.01)
*F16K 37/00* (2006.01)

(52) U.S. Cl.
CPC .......... *B23P 15/001* (2013.01); *F16K 27/067* (2013.01); *F16K 37/0008* (2013.01)

(58) Field of Classification Search
CPC .... B23P 15/001; F16K 27/02; F16K 37/0008; F16K 27/067
USPC .......................................................... 137/553
See application file for complete search history.

(56) References Cited

U.S. PATENT DOCUMENTS

| | | |
|---|---|---|
| 4,719,939 A | 1/1988 | Killian |
| 4,887,634 A | 12/1989 | Killian |
| 5,139,041 A * | 8/1992 | Albrecht ................. F16K 35/06 137/15.22 |
| 5,203,370 A | 4/1993 | Block et al. |
| 5,323,805 A * | 6/1994 | Scaramucci ............ F16K 35/06 137/382 |
| 5,564,461 A | 10/1996 | Raymond, Jr. et al. |
| 5,634,486 A | 6/1997 | Hatting et al. |
| 5,954,088 A | 9/1999 | Huang |
| 5,967,171 A | 10/1999 | Dwyer, Jr. |
| 6,446,935 B1 | 9/2002 | Winkler |
| 6,662,821 B2 | 12/2003 | Jacobsen et al. |
| 6,742,765 B2 * | 6/2004 | Takano ................. F16K 31/047 251/292 |
| 6,820,647 B1 | 11/2004 | Grecco et al. |
| 6,913,034 B2 | 7/2005 | Szafron |
| 7,066,192 B1 | 6/2006 | Delaney et al. |

(Continued)

FOREIGN PATENT DOCUMENTS

EP 1 488 150 3/2010

*Primary Examiner* — Angelisa L. Hicks
(74) *Attorney, Agent, or Firm* — Dunlap Codding, P.C.

(57) ABSTRACT

A valve position indicator mounting kit and method for mounting a valve position indicator to a manually operated valve. The mounting kit includes a mounting bracket and a stop plate assembly. The mounting bracket is connectable to the valve and has a bottom portion with a stem aperture through which a valve stem is extendable and being configured to be matingly engageable with the valve body. The mounting bracket has an upper portion with a shaft aperture. The locking plate assembly has a base portion matingly engaged with the valve stem and a shaft connection portion mounted to the top portion of the mounting bracket assembly and having a shaft matingly engaged with the shaft connecting portion of the locking plate assembly in a way that rotation of the valve stem via the handle causes the shaft to rotate.

19 Claims, 7 Drawing Sheets

(56) References Cited

U.S. PATENT DOCUMENTS

| | | | | |
|---|---|---|---|---|
| 7,404,543 | B2 * | 7/2008 | Weston | F16K 47/023 |
| | | | | 251/286 |
| 8,256,742 | B2 * | 9/2012 | Staffiere | F16K 31/055 |
| | | | | 251/129.11 |
| 8,601,634 | B1 * | 12/2013 | Stunkard | F16L 55/46 |
| | | | | 137/268 |
| 2007/0176068 | A1 | 8/2007 | Kuo-Chen | |
| 2013/0206238 | A1 * | 8/2013 | Gent | F16K 1/224 |
| | | | | 137/1 |
| 2014/0001383 | A1 | 1/2014 | Staffiere et al. | |

* cited by examiner

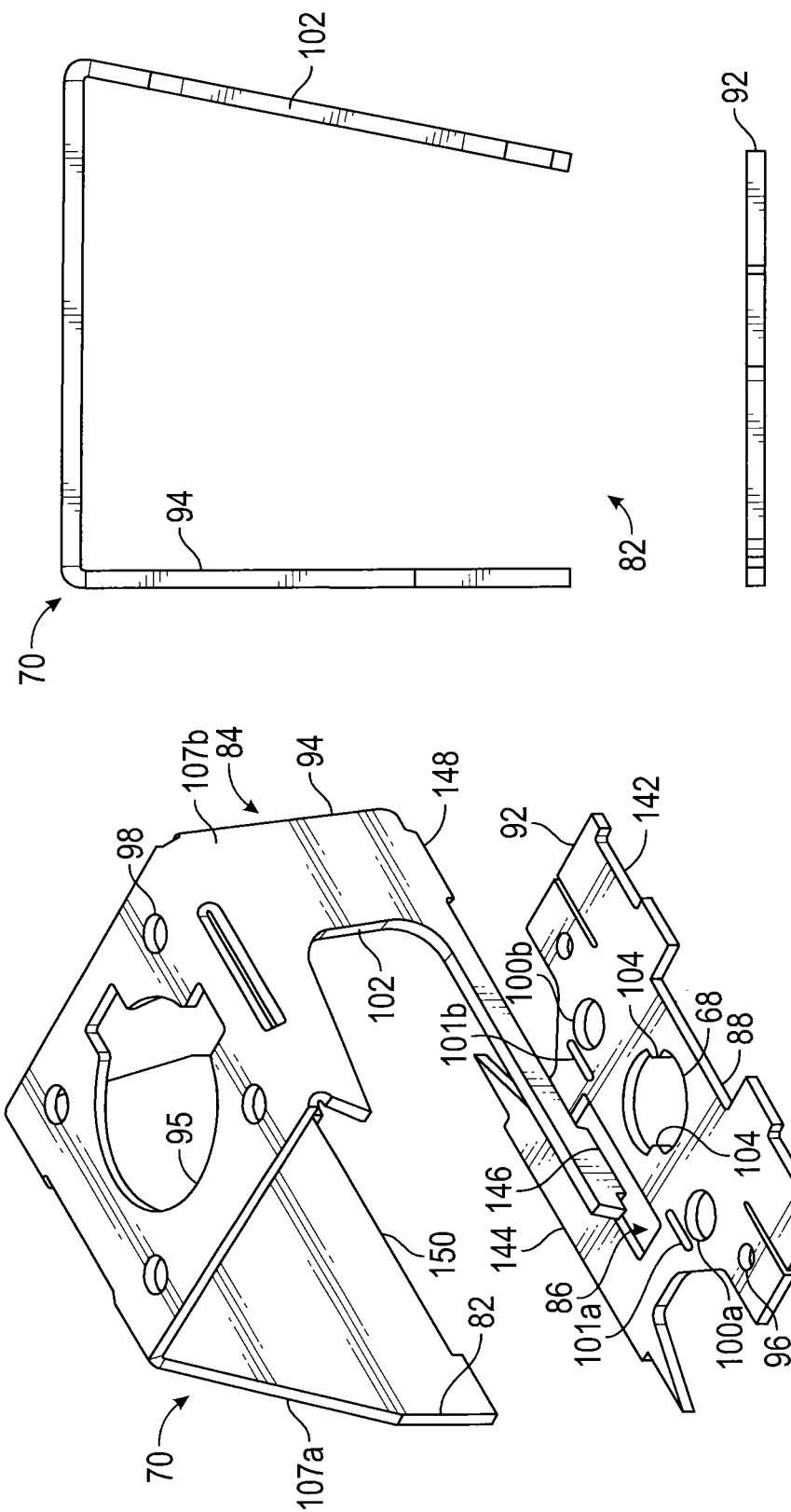

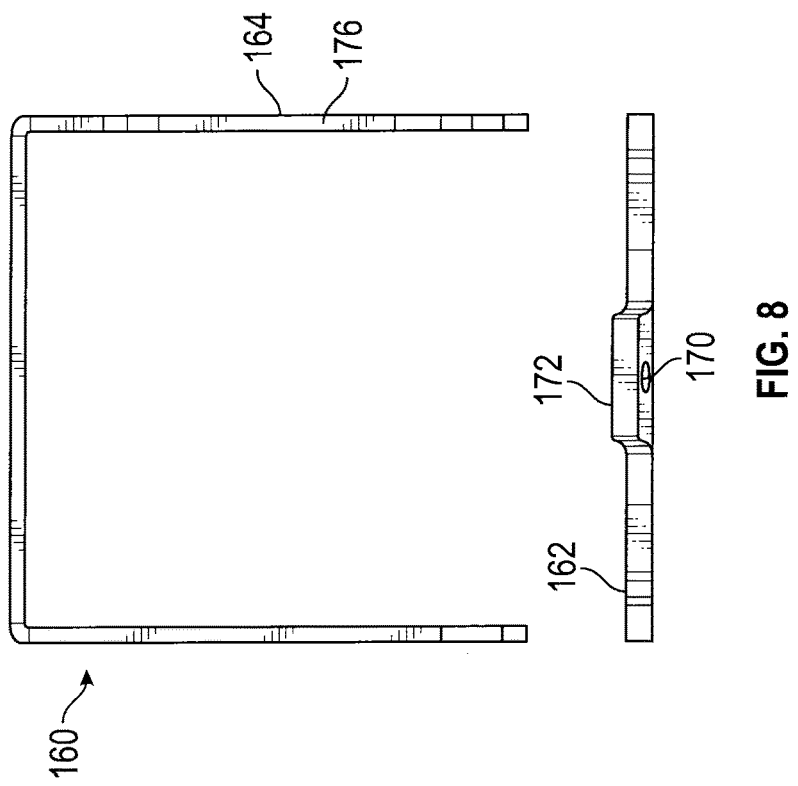
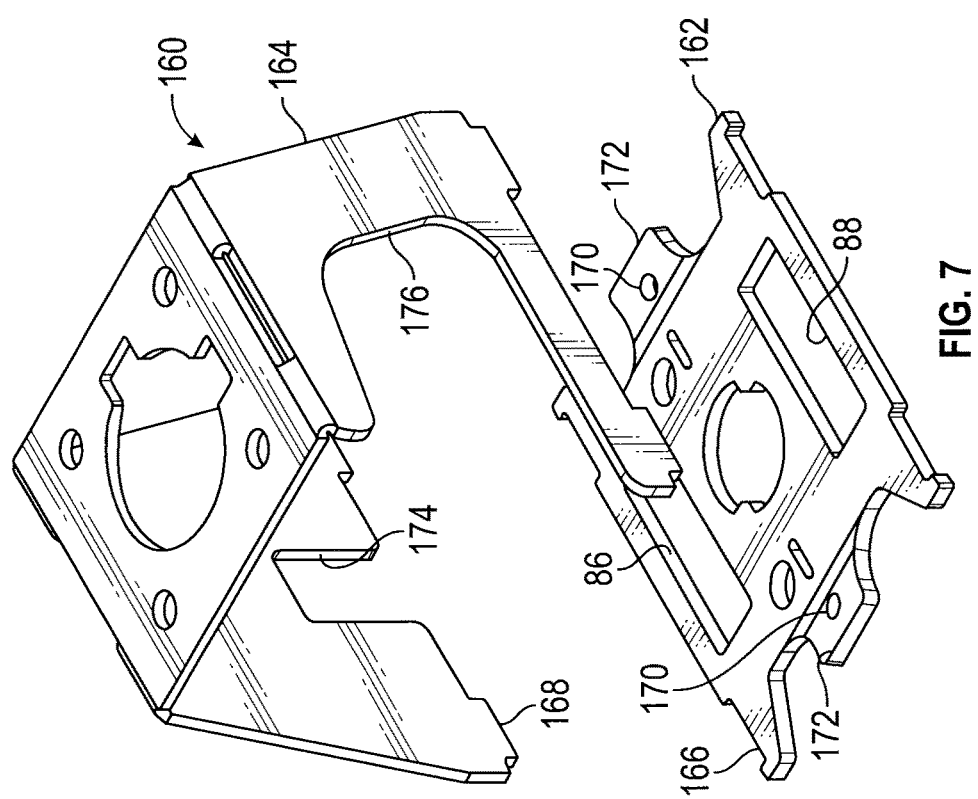

KIT FOR MOUNTING A VALVE POSITION INDICATOR TO A VALVE

BACKGROUND

Numerous types of valves exist to regulate fluid flow within a piping system or flow conduit. In some instances, it is desired to provide a valve with position transmitters which communicate the relative operational position of the valve to remotely located controlling or monitoring equipment. Position transmitters may be used, for instance, when the valve is remotely situated, difficult to reach, or located in hazardous environments to allow for the identification of a valve's position from a safe and remote distance.

Valve position transmitters are often used in conjunction with an automatic valve actuator which enables the position of the valve to be controlled from a remote location. However, many valves remain manually operated by the turning of a handle. Nevertheless, it is desirable to be able to easily monitor the position of the valve whether by visual inspection or from a remote location. Accordingly, a need exists for a kit for reliably mounting a valve position indicator to a manually operated valve in a way that maintains the manual operation of the valve. It is to such a kit that the inventive concepts disclosed herein are directed.

BRIEF DESCRIPTION OF THE DRAWINGS

FIG. 5 is an exploded, top perspective view of a mounting bracket assembly of the valve position indicator mounting kit.

FIG. 6 is an exploded, side elevational view of the mounting bracket assembly of FIG. 5.

FIG. 7 is an exploded, top perspective view of another embodiment of a mounting bracket assembly of the valve position indicator mounting kit.

FIG. 8 is an exploded, side elevational view of the mounting bracket assembly of FIG. 7.

DETAILED DESCRIPTION OF EXEMPLARY EMBODIMENTS

Figure 1:
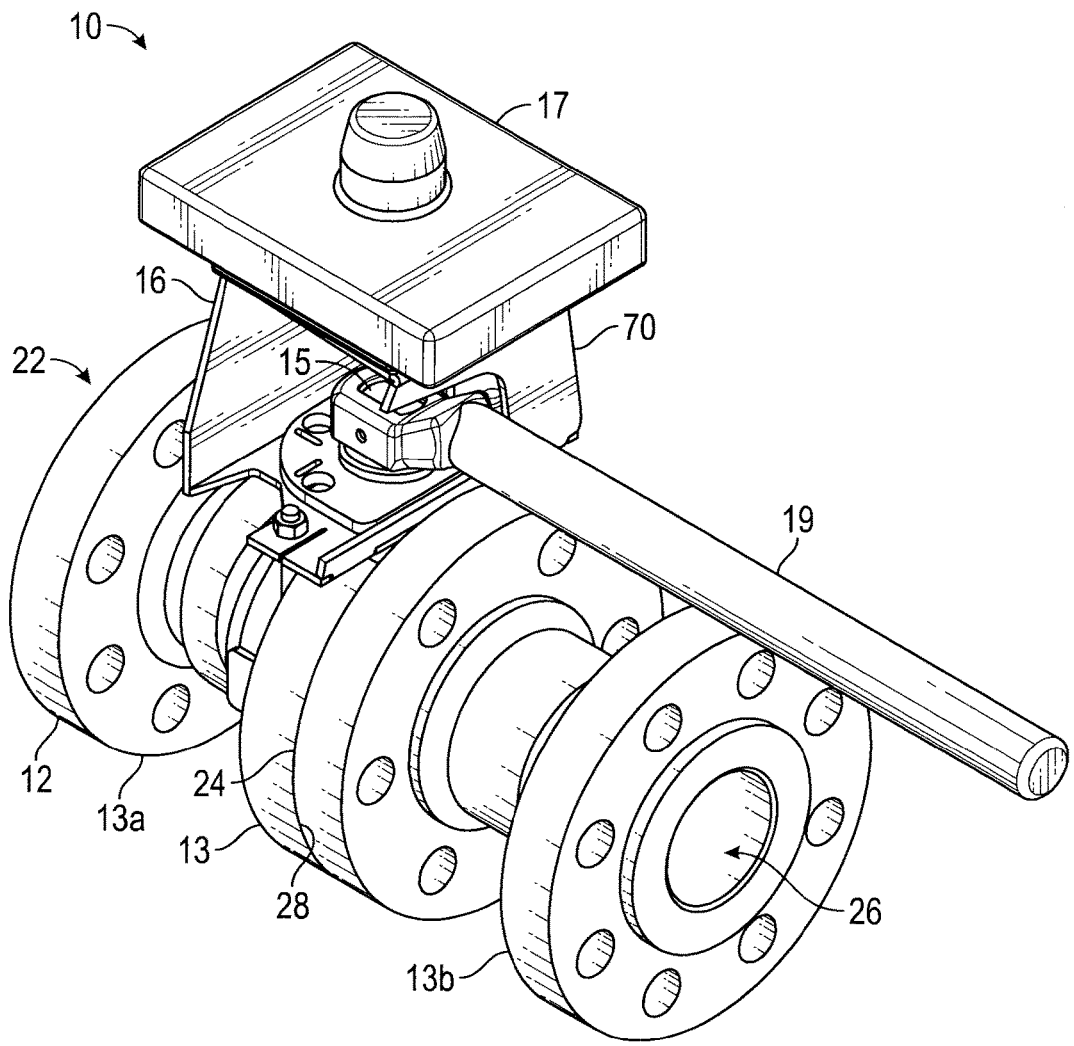
FIG. 1 is a perspective view of a valve assembly with a valve position indicator mounting kit constructed in accordance with the inventive concepts disclosed herein shown connecting a valve position indicator to a valve.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The systems and methods as described in the present disclosure are capable of other embodiments or of being practiced or carried out in various ways. Also, it is to be understood that the phraseology and terminology employed herein is for purposes of description, and should not be regarded as limiting.

The following detailed description refers to the accompanying drawings. The same reference numbers in different drawings may identify the same or similar elements.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements, but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, any reference to "one embodiment," "an embodiment," "some embodiments," "one example," "for example," or "an example" means that a particular element, feature, structure or characteristic described in connection with the embodiment is included in at least one embodiment. The appearance of the phrase "in some embodiments" or "one example" in various places in the specification is not necessarily all referring to the same embodiment, for example.

Referring now to the drawings, and in particular to FIGS. 1-4, shown therein is an embodiment of a valve assembly 10 constructed in accordance with the inventive concepts disclosed herein. In general, the valve assembly 10 includes a valve 12, a valve position indicator mounting kit 16, and a valve position indicator 17 operably connected to the valve 12 and supported by the valve position indicator mounting kit 16.

The valve 12 is provided with a valve body 13, a valve member 14 disposed in the valve body 13 for rotation between an open position (FIG. 3) and a closed position (not shown), and a valve stem 15 to which a handle 19 is connected for rotating the valve member 14 between the open position and the closed position.

The handle 19 is provided with a valve stem slot 21 configured to receive at least a portion of the valve stem 15, and means for securing the handle 19 to the valve stem 15 such as, for instance, a set screw 23.

As shown in FIGS. 1-4, the valve body 13 may include a first valve body 13a and a second valve body 13b. In such an embodiment, the first valve body 13a is provided with a first bore 22 and a first end 24. The second valve body 13b is provided with a second bore 26 and a second end 28. The first end 24 of the first valve body 13a is connected to the second end 28 of the second valve body 13b to form the valve body 13 such that the first bore 22 communicates with the second bore 26. The first valve body 13a may be connected to the second valve body 13b with connecting members (not shown), such as bolts.

Figure 2:
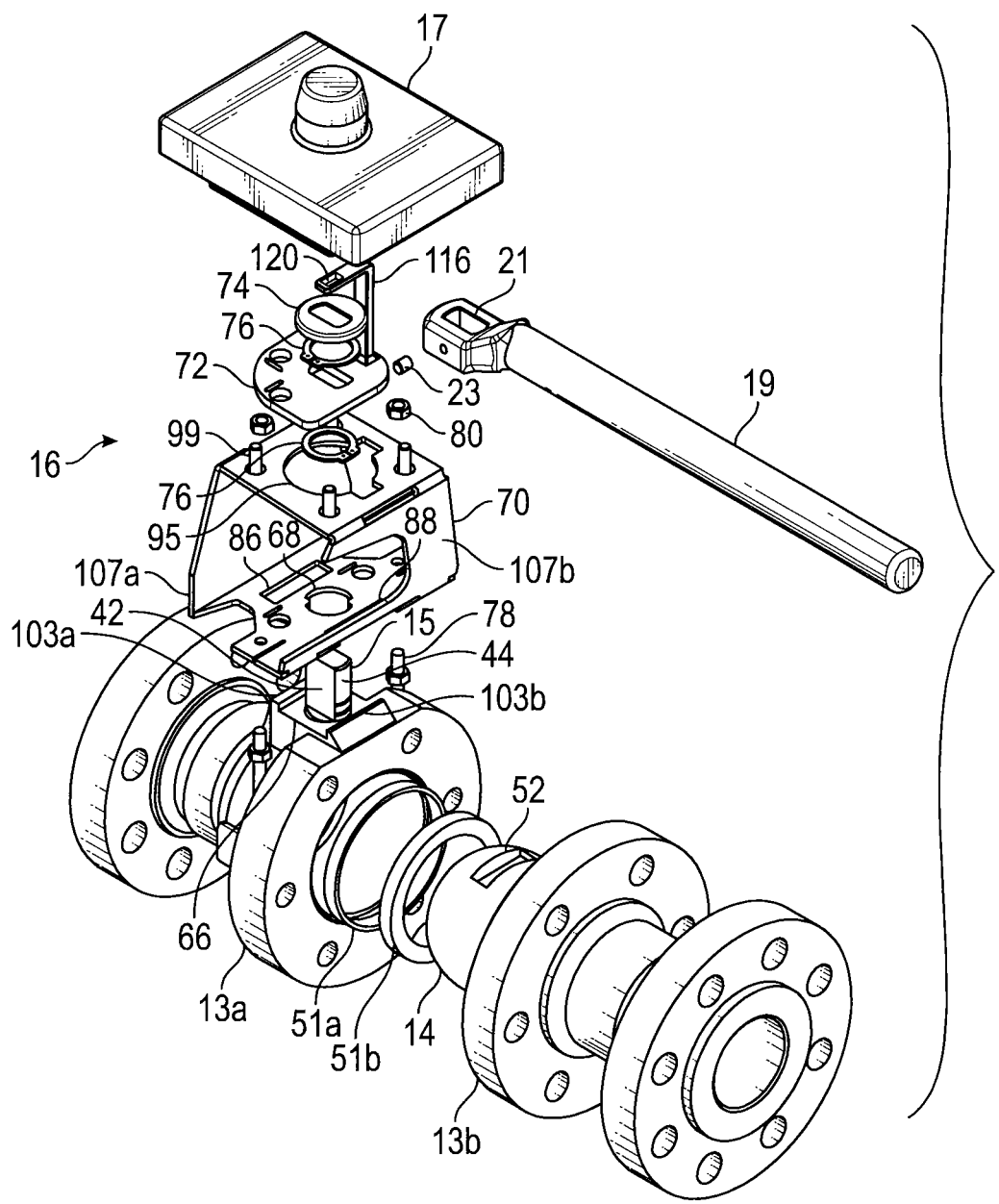
FIG. 2 is an exploded, perspective view of the valve assembly of FIG. 1.

In embodiment shown, the first valve body 13a of the valve 12 is provided with a bore 38 extending upwardly from a valve chamber 46 formed in the first bore 22 of the first valve body 13a. The bore 38 is configured to receive at least a portion of the valve stem 15. As best shown in FIG. 2, the valve stem 15 is provided with a pair of parallel, flat surfaces 42, which leave curved surfaces 44 on an outer surface of the valve stem 15 between the flat surfaces 42.

Figure 3:
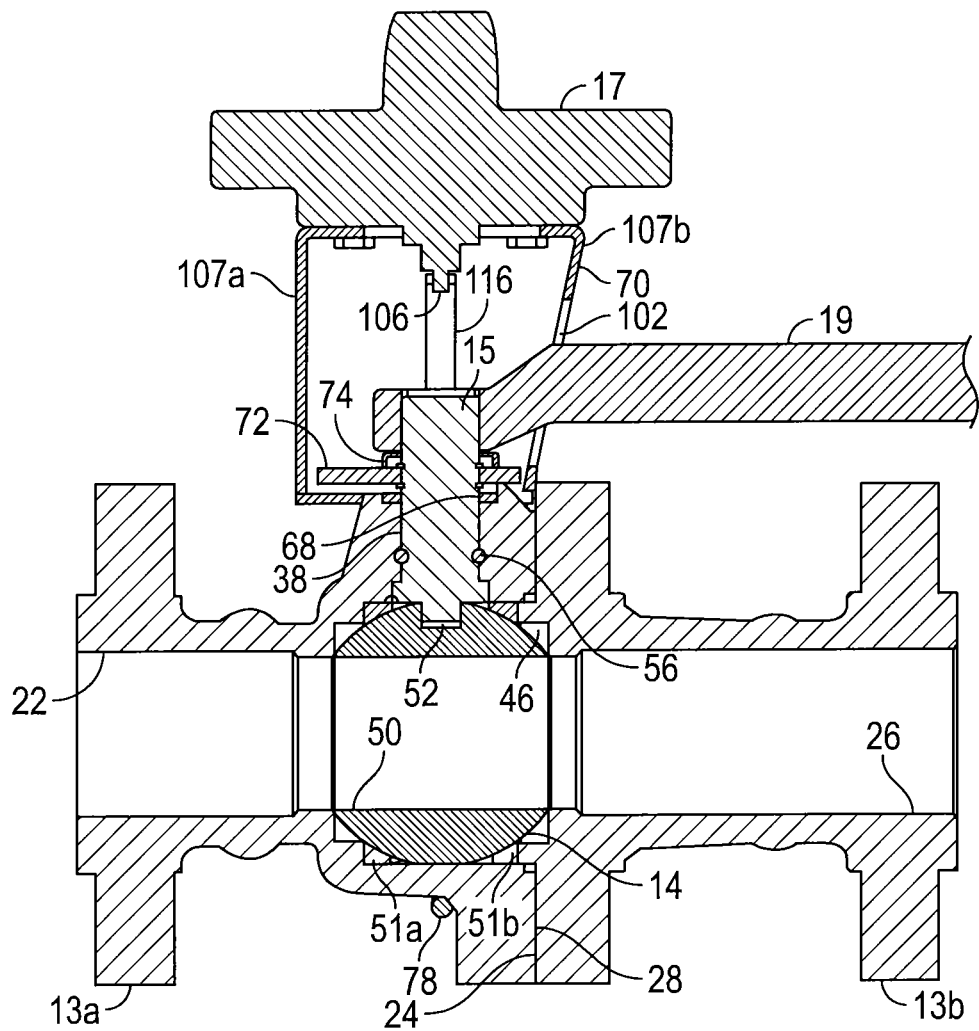
FIG. 3 is a partial sectional view of the valve assembly of FIG. 1.

As best shown in FIG. 3, the valve member 14 has a central bore 50 which aligns with the first bore 22 and the second bore 26 in the open position of the valve member 14 to permit the passage of fluid through the valve 12 when the valve member 14 is in the open position thereof. In the closed position of the valve member 14, seat assemblies 51a or 51b engage an exterior surface of the valve member 14 and internal surfaces of the valve body 13 to form fluid tight seals which disrupt fluid communication between the first bore 22 and the second bore 26. The valve member 14 has an exterior slot 52 for receiving a distal end of the valve stem 15. The exterior slot 52 is sized with respect to the valve stem 15 to permit movement of the valve member 14 in an axial direction when the valve member 14 is rotated to the closed position. Thus, the valve member 14 illustrated herein is of the type known in the art as a "floating" valve member or valve ball.

A suitable seal 56 fits in a mating groove around the central portion of the valve stem 15 to prevent leakage from the valve chamber 46 through the bore 38 around the valve stem 15.

Referring now to FIGS. 1-6, in one embodiment, the valve position indicator mounting kit 16 is provided with a mounting bracket assembly 70, a locking plate assembly 72, a weather seal 74, a plurality of split retainer rings 76, a connector such as a U-bolt 78, and a plurality of nuts 80.

The mounting bracket assembly 70 has a lower portion 92 and an upper portion 94 spaced from the lower portion 92. The lower portion 92 includes a valve stem aperture 68 through which the valve stem 15 extends, and the lower portion 92 is configured to matingly engage with the slot 66 of the valve body 13 (FIG. 3). In the embodiment shown, the valve stem aperture 68 extends through a central portion of the lower portion 92. The valve stem aperture 68 may be configured to receive at least a portion of the valve stem 15. The valve stem aperture 68 is provided with a pair of shoulders 104 (FIG. 5) projecting inwardly in the valve stem aperture 68 positioned to engage the flat surfaces 42 of the valve stem 15 when the valve stem 15 is turned either into the open or closed position. The shoulders 104 are positioned to limit the rotational movement of the valve stem 15 to between 0° and 90°. When the valve stem 15 is positioned such that the valve member 14 is in a fully open position (as shown in FIG. 3), the flat surfaces 42 of the valve stem 15 will engage one side of the shoulders 104. Rotation of the valve stem 15 through an angle of 90° positions the valve member 14 in a fully closed position (not shown), and the flat surfaces 42 of the valve stem 15 will engage the other side of the shoulders 104.

The lower portion 92 also has a pair of lock-out apertures in the form of holes 100a and 100b and/or slots 101a and 101b generally located on opposite sides of the valve stem aperture 68 for purposes to be described.

To facilitate mating engagement of the lower portion 92 with the slot 66, the lower portion 92 provided with slots 86 and 88 configured to receive opposing portions 103a and 103b (FIG. 2) of the valve body 13 adjacent the slot 66 so that the portion of the lower portion 92 surrounding the stem aperture 68 is able to mate with the slot 66 with the valve stem aperture 68 of the mounting bracket assembly 70 substantially aligned with the bore 38 of the first valve body 13a.

The upper portion 94 has a shaft aperture 95 for receiving the shaft 106 of the valve positioning indicator 17. The upper portion 94 is supported relative to the lower portion 92 by at least a first wall 107a and a second wall 107b. Each of the first wall 107a and the second wall 107b extends between the lower portion 92 and the upper portion 94 so as to define an open side 82. The second wall 107b is provided with a handle receiving notch 102 so as to be in open communication with the open side 82 to permit the handle 19 of the valve 12 to be rotated through an angle of about 90°.

The shaft aperture 95 extends through a central portion of the upper portion 94 and may be aligned with the valve stem aperture 68. The shaft aperture 95 is configured to receive the shaft 106 (FIGS. 3 and 4) of the valve position indicator 17 through the upper portion 94. In some embodiments, the valve stem aperture 68 may have a first diameter for receiving the valve stem 15 and the shaft aperture 95 may have a second diameter for receiving the shaft 106 of the valve position indicator 17.

Figure 4:
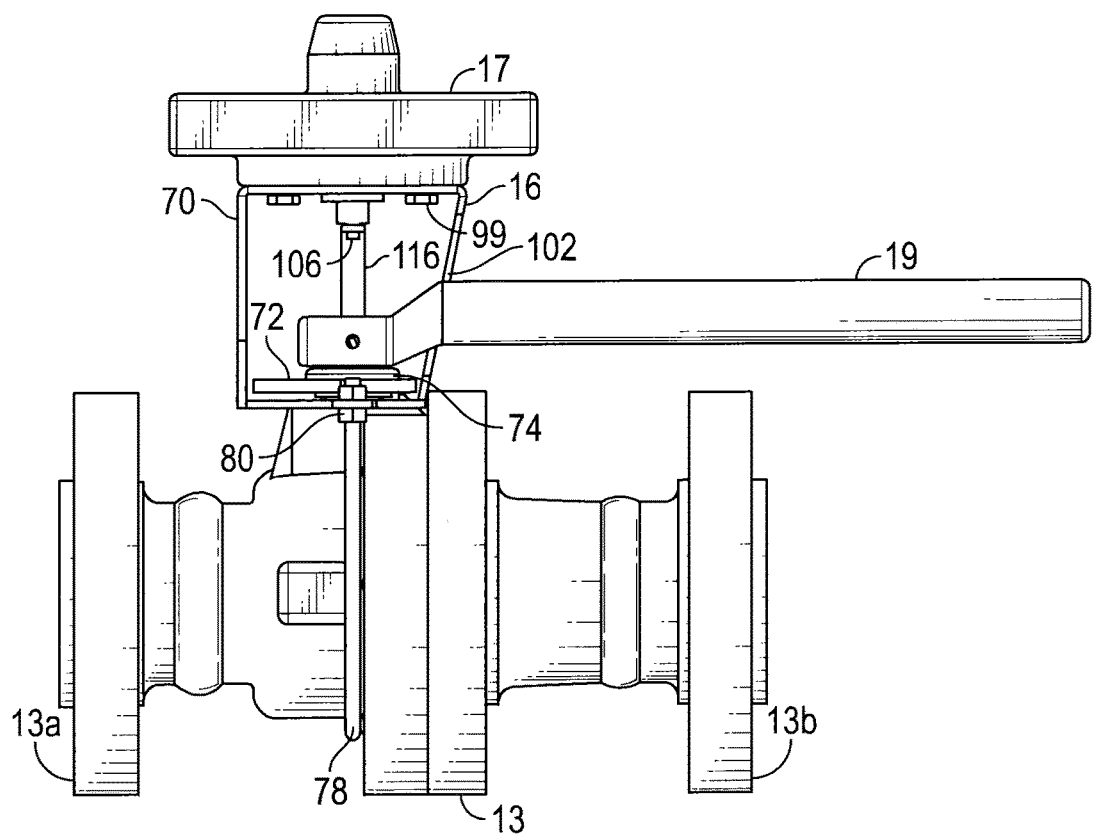
FIG. 4 is a side elevational view of the valve assembly of FIG. 1.

A plurality of mounting bores 96 of the mounting bracket assembly 70 extend through the lower portion 92 thereof. The mounting bores 96 are sized to allow threaded ends of the U-bolt 78 to pass therethrough and secure the mounting bracket assembly 70 to the first valve body 13a with nuts 80 (as shown in FIGS. 1 and 4).

A plurality of valve position indicator mounting bores 98 of the mounting bracket assembly 70 may be sized and arranged to allow the valve position indicator 17 to be mounted and secured to the upper portion 94 of the mounting bracket assembly 70 via securing means such as, for instance, bolts 99 (FIGS. 2 and 4) or other securing means known in the art.

Figure 9A:
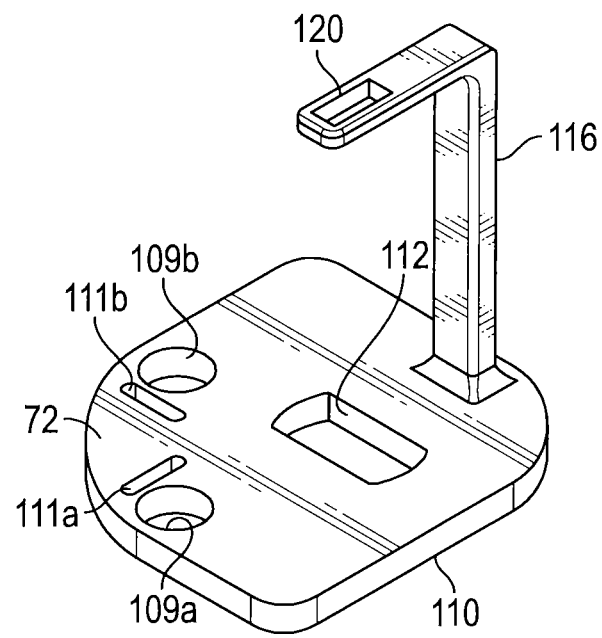
FIG. 9A is a top perspective view of a locking plate assembly in accordance with one embodiment of the valve position indicator mounting kit.

As best shown in FIG. 9A, the locking plate assembly 72 is provided with a base portion 110 and a shaft connecting portion 116. The base portion 110 has a valve stem aperture 112 therethrough shaped and sized to fit closely around the outer surface of the valve stem 15, such that when the valve stem 15 is turned, the locking plate assembly 72 is also turned. The locking plate assembly 72 is secured above the lower portion 92 by means of the split retainer rings 76 mounted in mating grooves in the curved portions of the outer surface of the valve stem 15. Thus, a bottom surface of the base portion 110 is adjacent to the flat surface provided by the lower portion 92.

The valve stem aperture 112 of the locking plate assembly 72 extends through the base portion 110 and is configured to receive at least a portion of the valve stem 15 to allow rotation of the locking plate assembly 72 when the valve stem 15 is rotated, for instance, by the handle 19, to move the valve member 14 between an open or a closed position.

The base portion 110 of the locking plate assembly 72 has a pair of lock-out apertures in the form of holes 109a and 109b and/or slots 111a and 111b essentially 90° apart with respect to the valve stem aperture 112. The lock-out holes 109a and 109b through the base portion 110 are arranged to alternately mate with the lock-out openings 100a and 100b in the lower portion 92 when the valve 12 is in a fully open or a fully closed position. With this arrangement, a suitable lock (not shown) may be inserted through mating lock-out holes. A lock is particularly useful to lock the valve 12 in a fully closed position to comply with governmental regulations. It may also be noted that the lower portion 92 and the base portion 110 may be provided with the slots 111a and 111b arranged to mate with the slots 101a and 101b when the valve 12 is in a fully open or fully closed position to accommodate a suitable seal, rather than, or in addition to, a lock.

In the embodiment shown in FIG. 9A, the shaft connecting portion 116 is a generally flat piece of material having a predetermined width and is connected to the base portion 110. In the embodiment shown, the shaft connecting portion 116 forms a substantially right angle a predetermined distance from the base portion 110. The shaft connecting portion 116 is provided with a shaft receiving aperture 120 formed through an upper portion thereof. The shaft receiving aperture 120 may be sized and positioned to receive at least a portion of the shaft 106 of the valve position indicator 17 when the valve position indicator 17 is connected to the valve position indicator mounting kit 16.

Figure 9B:
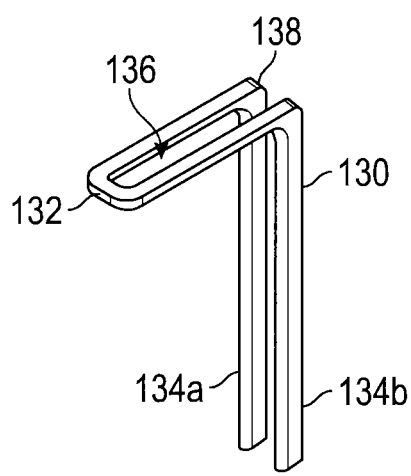
FIG. 9B is a top perspective view of one embodiment of a shaft connecting portion that may be connected to a base portion of a locking plate assembly in accordance with one embodiment of the valve position indicator mounting kit.

In another embodiment shown in FIG. 9B, a shaft connecting portion 130 is constructed of a single piece of generally tubular material formed with a central bend 132 having a predetermined radius and arc which results in two parallel members 134a and 134b spaced apart by a predetermined distance. The space between the parallel members 134a and 134b forms a shaft receiving aperture 136 configured to receive at least a portion of the shaft 106 of the valve position indicator 17. The two parallel members 134a and 134b may be formed as necessary such that when the shaft connecting portion 130 is connected to the base portion 110, shaft receiving portion 136 of the shaft connecting portion 130 may be operably connected to the shaft 106 of the valve position indicator 17 when the valve position indicator mounting kit 16 is connected to the valve 12 and the valve position indicator 17 is connected to the valve position indicator mounting kit 16. For instance, a right angle bend 138 may be formed a predetermined distance from ends of the tubular material. It should be noted, however, that the tubular material of the shaft connecting portion 130 may be formed other ways so long as the shaft sensor receiving portion 136 of the shaft connecting portion 130 engages the shaft 106 of the valve position indicator 17 when the valve position indicator mounting kit 16 is connected to the valve 12 and the valve position indicator 17 is connected to the valve position indicator mounting kit 16.

As shown in FIGS. 5 and 6, the mounting bracket assembly 70 may be constructed from more than one piece. For instance, the lower portion 92 may be formed as one piece and the upper portion 94 may be formed as another piece. In such an embodiment, the lower portion 92 and the upper portion 94 may be secured together by connecting means such as, for instance, welding to form the mounting bracket assembly 70.

As best shown in FIG. 5, the lower portion 92 may be provided with a first notch 140, a second notch 142, and a first tab 144. The first notch 140 and the second notch 142 are configured to receive a third tab 146 and fourth tab 148, respectively, of the upper portion 94 and a third notch 150 of the upper portion 94 is configured to receive the first tab 144 of the lower portion 92. In this way, proper alignment of the lower portion 92 and the upper portion 94 is assured when the lower portion 92 and the upper portion 94 are secured together.

Referring now to FIGS. 7 and 8, a mounting bracket assembly 160 is shown in accordance with one embodiment of the valve position indicator mounting kit 16. The mounting bracket assembly 160 is similar to the mounting bracket assembly 70 described above. Therefore, in the interest of brevity, only the different features will be designated and described herein. In the embodiment shown, the mounting bracket assembly 160 is provided with a bottom portion 162 and a top portion 164 which may be secured together to form the mounting bracket assembly 160.

To facilitate connection and alignment of the bottom portion 162 and the top portion 164, the bottom portion 162 is provided with a plurality of mounting notches 166 (only one of which is designated in FIG. 7) sized and spaced to receive a plurality of corresponding mounting tabs 168 (only one of which is designated in FIG. 7) on the top portion 164.

Mounting bores 170 are formed in adjustable tabs 172 formed in the bottom portion 162 of the mounting bracket assembly 160. As illustrated in FIGS. 7 and 8, the tabs 172 may be bent as necessary to facilitate securing the mounting bracket assembly 160 using connecting means, such as, for instance U-bolts 78.

In the embodiment shown, a notch 174 may be formed extending through at least a portion of one side of the top portion 164 opposite a handle receiving notch 176.

The modular nature of the two-piece mounting bracket assemblies 70 and 160 shown in FIGS. 5-8 allows the valve position indicator mounting kit 16 to accommodate the many different types, sizes, and combinations of valves and valve position indicators. For instance, in the embodiments shown in FIGS. 5-8, the slots 86 and 88, the valve stem aperture 68, shaft aperture 95, and locking holes 100a and 100b and slots 101a and 101b are shown sized and space substantially the same. However, to connect to a two-piece valve such as the valve 12 shown in FIGS. 1-4, where the mounting bracket assembly 70 must fit around a shoulder or other feature, the lower portion 92 of the mounting bracket assembly 70 is narrower on one side and one side of the upper portion 94 has been angled accordingly (as shown in FIG. 6) to mate with the lower portion 92.

In operation of the valve assembly 10, rotation of the valve stem 15 rotates the locking plate assembly 72 and the shaft connecting portion 116 or 130, which is connected to the locking plate assembly 72 moves the shaft 106 of the valve position indicator 17 between an on and an off position. To accommodate different valve position indicators 17, the shaft aperture 120 or the shaft receiving portion 136 may be sized and positioned appropriately. For instance, by way of non-limiting example, in the embodiment shown in FIGS. 1-4, the shaft 106 of the valve position indicator 17 forms a generally rectangular end which rotates around a central axis of the valve position indicator 17 between the on and the off position. In such an embodiment, the shaft aperture 120 forms a generally rectangular shape sized to match the rectangular end of the shaft 106. To ensure proper operation of the valve position indicator 17, center points of the shaft aperture 120 and the valve stem connecting portion 112 of the locking plate assembly 72 are substantially aligned vertically with a center point of the valve stem aperture 68 and the shaft aperture 95 of the mounting bracket assembly 70. This vertical alignment in turn ensures that when the valve position indicator mounting kit 16 is assembled and the valve 12 and the valve position indicator 17 are connected, the valve stem 15 and the shaft 106 of the valve position indicator 17 will be vertically aligned as well. Thus, the valve stem 15, the locking plate assembly 72, and the shaft 106 of the valve position indicator 17 rotate around a single central axis.

For the purposes of illustration, a method of connecting a valve position indicator 17 to the valve 12 using the valve position indicator mounting kit 16 will be described herein. By way of non-limiting example, the valve 12 may be an existing valve to which the valve position indicator 17 is going to be added or retrofit. For the purposes of this illustration, the valve 12 will be described as a valve constructed in accordance with the valve described in U.S. Pat. No. 5,323,805, the description of which is hereby incorporated herein by reference in its entirety. For the purposes of clarity, features which are similar will be designated with the same numbers used herein.

As described in U.S. Pat. No. 5,323,805, slot 66 is provided to matingly receive a stop plate. In use, the stop plate is positioned in the slot 66 and encircles a valve stem 15. The stop plate has at least one locking opening spaced apart from a valve stem aperture 68. A locking plate is secured on the valve stem 15 parallel with the stop plate and turns with the valve stem 15 during opening and closing of the valve 12. The locking plate has at least one locking opening therethrough positioned to mate with the locking opening in the indexing plate. When the valve 12 is in a fully closed and/or a fully open position, a securing member such as, for instance, a lock may be inserted through corresponding locking openings in the stop plate and the locking plate to secure the valve 12 in the desired position.

To retrofit the valve position indicator 17 to the valve 12 using the valve position indicator mounting kit 16, the handle 19, the stop plate, and the locking plate are first removed from the valve 12. The mounting bracket assembly 70 is connected to the valve body 13 with the valve stem 15 extending through the valve stem aperture 68 and the lower portion 92 matingly engaged with the slot 66. To secure the mounting bracket assembly 70 to the valve body 13, the split ring 76 is inserted into the lower mating grooves in the curved surfaces 44 of the outer surface of the valve stem 15 above the mounting bracket assembly 70 and threaded ends of the U-bolt 78, which is positioned surrounding a portion of the valve body 13, are inserted through the mounting bores 96 and secured with nuts 80.

The locking plate assembly 72 is then positioned over the valve stem 15 and secured by inserting one of the split rings 76 into the mating grooves in the curved surfaces 44 of the outer surface of the valve stem 15 above the locking plate assembly 72. The weather seal 74 may then be positioned over the valve stem 15.

The handle 19 is then engaged with the valve stem 15 in a way that at least a portion of the valve stem 15 extends through the valve stem slot 21 of the handle 19. The handle 19 may then be secured to the valve stem 15 with the set screw 23. When installed, the handle 19 extends through the open side 82 or the handle opening 102 of the mounting bracket assembly 70. The position of the handle 19 when installed is determined by the open or closed position of the valve member 14.

To connect the valve position indicator 17 to the mounting bracket assembly 70, the shaft 106 of the valve position indicator 17 is inserted through the shaft aperture 95 and aligned so that at least a portion of the shaft 106 extends through the shaft aperture 120 of the shaft connecting portion 116. The valve position indicator 17 is then secured to the upper portion 94 of the mounting bracket assembly 70 with bolts 99.

In operation of the valve assembly 10, the handle 19 is engaged to move the valve 12 between the open and closed positions. Movement of the handle 19 along a predetermined arc moves the valve stem 15 and thus valve member 14 between the open and closed positions. Movement of the valve stem 15 moves the locking plate assembly 72 and the shaft connecting portion 116 of the locking plate assembly 72 moves the valve position indicator 17 between an on and off position corresponding to the open and closed position of the valve member 14.

In operation of the valve 12, as the handle 19 is engaged to move the valve 12 between the open and closed positions, the handle 19 is rotated along a 90° arc extending between the open side 82 and the handle opening 102.

While the valve 12 is described herein as having first and second valve bodies 13a and 13b which are secured together to form the valve body 13, it should be noted that in some embodiments, the valve 12 may be provided with a different valve body design such as, for instance, a unibody design similar to the one shown and described in U.S. Pat. No. 5,323,805, so long as the mounting bracket is securable to the valve body.

It should also be noted that although the valve 12 of the valve assembly system 10 has been shown and described herein as a ball-type valve, the presently disclosed concepts are applicable to all types of rotationally controlled valves.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the scope and coverage of the inventive concepts disclosed and claimed herein.

What is claimed is:

1. A valve position indicator mounting kit for mounting a valve position indicator to a valve, the valve having a valve body, a valve member rotatably disposed within a bore of the valve body between an open position and a closed position, a valve stem journaled in an aperture of the valve body and connected at the valve member for rotation thereof, the valve position indicator mounting kit comprising:

a mounting bracket assembly connectable to the valve body, the mounting bracket assembly having a lower portion and an upper portion spaced from the lower portion, the lower portion having a valve stem aperture through which the valve stem extends when the mounting bracket assembly is connected to the valve body, the upper portion having a shaft aperture; and a locking plate assembly having a base portion and a shaft connecting portion, the base portion being matingly engageable with the valve stem and the shaft connecting portion extending from the base portion and matingly engageable with a shaft of the valve position indicator when the valve position indicator is connected to the top portion of the mounting bracket assembly and the shaft of the valve position indicator extends through the shaft aperture of the mounting bracket assembly, wherein the shaft connecting portion of the locking plate has a proximal end and a distal end, the proximal end connected to the base portion in an offset relationship to the valve stem aperture and the distal end of the shaft connecting portion positioned to be engageable with the shaft of the valve position indicator when the lower portion of the mounting bracket assembly is connected to the valve body and the valve position indicator is connected to the upper portion of the mounting bracket assembly with the shaft of the valve position indicator aligned with and spaced from the valve stem.

2. The valve position indicator mounting kit of claim 1, further comprising a connector positionable about the valve body and connected to the mounting bracket assembly.

3. The valve position indicator mounting kit of claim 2, wherein the connector is a U-bolt positionable about the valve body and secured to the bottom portion of the mounting bracket assembly.

4. The valve position indicator mounting kit of claim 3, wherein the valve body has an outer surface provided with a slot around the aperture, and wherein the lower portion is configured to be matingly engageable with the slot of the valve body when the mounting bracket assembly is connected to the valve body.

5. The valve position indicator mounting kit of claim 1, wherein the upper portion is supported in a spaced relationship relative the lower portion by at least a first wall and a second wall, each of the first wall and the second wall extending between the upper portion and the lower portion so as to define an open side, the second wall having a handle receiving notch in communication with the open side to permit a handle of the valve to be rotated through an angle of about 90°.

6. The valve position indicator mounting kit of claim 1, wherein the lower portion of the mounting bracket assembly has at least one locking aperture spaced apart from the stem aperture, and wherein the base portion of the locking plate assembly has at least one locking aperture therethrough positioned to mate with the locking aperture in the lower portion when the valve is in a fully closed position.

7. A valve assembly, comprising:
   a valve comprising:
      a valve body having an upstream end face, a downstream end face, a bore extending therethrough intersecting the end faces, and an aperture formed therein intersecting the bore;
      a valve member disposed within the bore of the valve body intermediate the end faces and rotatable from a position wherein the bore is open to a position wherein the bore is closed; and
      a valve stem journaled in the aperture of the valve body and connected at an inner end thereof to the valve member for rotation thereof; and
      a handle connected to and extending from the valve stem;
   a valve position indicator mounting kit comprising:
      a mounting bracket assembly connected to the valve body, the mounting bracket assembly having a lower portion and an upper portion spaced from the lower portion, the lower portion having a valve stem aperture through which the valve stem extends, the top portion having a shaft aperture; and
      a locking plate assembly having a base portion matingly engaged with the valve stem and a shaft connection portion; and
   a valve position indicator mounted to the upper portion of the mounting bracket assembly and having a shaft spaced from the valve stem and matingly engaged with the shaft connecting portion of the locking plate assembly in a way that rotation of the valve stem via the handle causes the shaft of the valve position indicator to rotate,
   wherein the shaft connecting portion of the locking plate has a proximal end and a distal end, the proximal end connected to the base portion in an offset relationship to the valve stem aperture and the distal end of the shaft connecting portion engaged with the shaft of the valve position indicator.

8. The valve assembly of claim 7, wherein the valve position indicator mounting kit further comprises a connector.

9. The valve assembly of claim 8, wherein the connector is a U-bolt positioned about the valve body and secured to the bottom portion of the mounting bracket assembly.

10. The valve assembly of claim 7, wherein the valve body has an outer surface provided with a slot around the aperture, and wherein the lower portion is matingly engaged with the slot of the valve body.

11. The valve assembly of claim 7, wherein the upper portion is supported in a spaced relationship relative the lower portion by at least a first wall and a second wall, each of the first wall and the second wall extending between the upper portion and the lower portion so as to define an open side, the second wall having a handle receiving notch in communication with the open side to permit the handle of the valve to be rotated through an angle of about 90°.

12. The valve assembly of claim 7, wherein the lower portion of the mounting bracket assembly has at least one locking bore spaced apart from the stem aperture, and wherein the base portion of the locking plate assembly has at least one locking bore therethrough positioned to mate with the locking bore in the portion when the valve is in a fully closed position.

13. A method for mounting a valve position indicator to a valve, the valve having a valve body, a valve member rotatably disposed within a bore of the valve body between an open position and a closed position, a valve stem journaled in an aperture of the valve body and connected at the valve member for rotation thereof, and a handle connected to the valve stem for rotation thereof, the valve body further having a stop plate having an aperture encircling the valve stem and at least one locking aperture spaced apart from the aperture and positioned in a slot formed in an outer surface of the valve body and a locking plate secured on the valve stem parallel with the stop plate to turn with the valve stem during opening and closing of the valve and having at least one locking aperture therethrough positioned to mate with the locking aperture in the stop plate when the valve is in a fully closed or fully open position, the method comprising:
   removing the handle, the stop plate, and the locking plate from the valve;
   connecting a mounting bracket assembly to the valve, the mounting bracket assembly having a lower portion and an upper portion spaced from the lower portion, the lower portion having a valve stem aperture through which the valve stem extends and the lower portion matingly engaged with the valve, the upper portion having a shaft aperture;
   connecting a locking plate assembly to the valve stem, the locking plate assembly having a base portion and a shaft connecting portion with the valve stem extending through a valve stem connecting portion in the base portion;
   connecting a valve position indicator to the upper portion of the mounting bracket assembly with a shaft of the valve position indicator spaced from the valve stem and connected to the shaft connecting portion of the locking plate assembly; and
   reconnecting the handle to the valve stem.

14. The method of claim 13, wherein the valve body has an outer surface provided with a slot around the aperture, and wherein the step of connecting the mounting bracket to the valve further comprises matingly engaging the lower portion with the slot.

15. The method of claim 13, wherein the shaft connecting portion has a proximal end and a distal end, the proximal end connected to the base portion in an offset relationship to the stem aperture and the distal end of the shaft portion engageable with the shaft of the valve position indicator.

16. The method of claim 13, wherein a weather seal is positioned over the valve stem between the locking plate assembly and the handle.

17. The method of claim 13, wherein the upper portion is supported in a spaced relationship relative the lower portion by at least a first wall and a second wall, each of the first wall and the second wall extending between the upper portion and the lower portion so as to define an open side, the second wall having a handle receiving notch in communication with the open side to permit the handle of the valve to be rotated through an angle of about 90°.

18. The method of claim 13, wherein the bottom portion of the mounting bracket assembly has at least one locking aperture spaced apart from the valve stem aperture, and wherein the base portion of the locking plate assembly has at least one locking aperture therethrough positioned to mate with the locking aperture in the lower portion when the valve is in a fully closed position.

19. A valve assembly, comprising:
  a valve comprising:
    a valve body having an upstream end face, a downstream end face, a bore extending therethrough intersecting the end faces, and an aperture formed therein intersecting the bore;
    a valve member disposed within the bore of the valve body intermediate the end faces and rotatable from a position wherein the bore is open to a position wherein the bore is closed; and
    a valve stem journaled in the aperture of the valve body and connected at an inner end thereof to the valve member for rotation thereof;
  a valve position indicator mounting kit comprising:
    a mounting bracket assembly connected to the valve body, the mounting bracket assembly having a lower portion and an upper portion spaced from the lower portion, the lower portion having a valve stem aperture through which the valve stem extends, the upper portion having a shaft aperture; and
    a locking plate assembly having a base portion matingly engaged with the valve stem and a shaft connection portion,
    wherein the bottom portion of the mounting bracket assembly has at least one locking bore spaced apart from the valve stem aperture, and wherein the base portion of the locking plate assembly has at least one locking bore therethrough positioned to mate with the locking bore in the bottom portion when the valve is in a fully closed position; and
  a valve position indicator mounted to the upper portion of the mounting bracket assembly and having a shaft matingly engaged with the shaft connecting portion of the locking plate assembly in a way that rotation of the valve stem via the handle causes the shaft to rotate.

* * * * *